United States Patent [19]
Garcia, Jr.

[11] Patent Number: 5,779,255
[45] Date of Patent: Jul. 14, 1998

[54] VESSEL TRANSPORT CARRIER AND METHOD FOR TRANSPORTING SUCH VESSEL

[76] Inventor: Daniel C. Garcia, Jr., P.O. Box 399, Cotulla, Tex. 78014

[21] Appl. No.: 654,525

[22] Filed: May 29, 1996

[51] Int. Cl.⁶ .................................................... B60P 3/022
[52] U.S. Cl. ........................ 280/404; 414/678; 414/458; 280/830
[58] Field of Search ............................. 280/404, 830; 414/678, 458, 495, 589

[56] References Cited

U.S. PATENT DOCUMENTS

| | | | |
|---|---|---|---|
| 1,015,592 | 1/1912 | Shryock | 280/830 |
| 1,479,351 | 1/1924 | Winterbottom. | |
| 2,772,010 | 11/1956 | Buehring | 214/394 |
| 2,997,292 | 8/1961 | Lucker et al. | 414/678 |
| 3,327,996 | 6/1967 | Morse | 414/458 |
| 3,578,348 | 5/1971 | Reinke | 280/5 |
| 3,631,999 | 1/1972 | Walerowski | 414/458 |
| 3,698,730 | 10/1972 | Hansen | 280/5 |
| 4,434,991 | 3/1984 | Winterton | 280/5 |
| 4,599,034 | 7/1986 | Kennedy et al. | 414/678 |
| 5,145,311 | 9/1992 | Salvucci | 414/592 |
| 5,154,568 | 10/1992 | Conner et al. | 414/458 |

*Primary Examiner*—Stephen Avila
*Attorney, Agent, or Firm*—Miller, Sisson, Chapman & Nash, P.C.

[57] ABSTRACT

A carrier for a vessel which has a front support carriage and a rear support carriage removably attached to the vessel, the entire assembly cooperating to form an integral transport structure. Each support carriage is independently attached to the vessel and provides an independent mechanism for raising and lowering the respective ends of the vessel. The carrier is particularly adaptable for use with commonly available propane tanks and each carriage can be attached using commonly available chains and hooks. The assembled transport carrier can be used to transport vessels manually, or can be easily adapted for use with a towing vehicle.

8 Claims, 5 Drawing Sheets

VESSEL TRANSPORT CARRIER AND METHOD FOR TRANSPORTING SUCH VESSEL

BACKGROUND OF THE INVENTION

1. Field of The Invention

This invention relates to a new and improved tank or pressure vessel carrier, and more particularly to a four wheeled carrier consisting of two separate support carriages, one for the front of the tank and one for the rear of the tank. In use, the tank itself becomes an integral part of the transport mechanism, when attached to each carriage and disposed between them. The invention can be used for many kinds of tanks or pressure vessels, but is particularly useful for use in large propane tank transportation.

2. Background Information

The prior art consists of several attempts to provide a means for transporting tanks or other similarly shaped vessels, which is both adjustable for various tank sizes and man-portable or towed by a vehicle.

U.S. Pat. No. 1,479,351, issued to Winterbottom, discloses the closest prior art to the present invention. However, Winterbottom's invention is limited to use with boilers having attached fire-boxes. The rear carriage involves two separate wheels which are "clipped" to opposing sides of the fire box. The front carriage consists of a single caster-wheel assembly. Not only is Winterbottom's carrier less stable than the present invention, but it is less versatile; Winterbottom's invention provides for a fixed carrying height between the boiler and the surface over which it is carried, and is not adaptable to articles which are generally cylindrical along their entire length. In short, Winterbottom's invention is directed specifically toward the physical characteristics of boilers with an attached fire box.

U.S. Pat. No. 2,772,010, issued to Buehring, discloses a storage tank trailer adapted to carry large tanks of varying lengths and diameters, as well as providing a means of elevating the tank. However, Buehring's invention does not provide for four wheeled stability, and makes use of a rather complicated system of pulleys and cylinders to elevate the tank. Furthermore, the entire trailer assembly must be put emplaced from one end of the tank, and if that end is not free of obstruction, use of this trailer is impossible.

U.S. Pat. No. 3,578,348, issued to Reinke, is directed toward a fertilizer tank trailer consisting of a frame whose length is approximately equal to the tank to be carried. Even though the length of the trailer is adjustable, it does not provide a simple and independent means of elevating each end of the tank. Also, the frame is approximately equal in length to that of the tank to be carried and, therefore, cannot be stored as easily as the instant invention.

U.S. Pat. No. 3,698,730, issued to Hansen, presents a tank trailer specifically directed toward use with tillage equipment. The chassis frame construction is such that the tank to be carried must be lowered onto the frame and is specifically designed with telescoping sidearms and journeying casters to allow attachment from the side to a farm implement. Hansen's invention does not contemplate adjustment for various lengths of tanks and is constructed so as to absorb torsional shock stresses while supporting the tank.

U.S. Pat. No. 4,434,991, issued to Winterton, discloses a tank transport frame which is pivotally suspended below a caster wheeled frame. The frame requires attachment to a vehicle for movement, and is not intended to accommodate man-portable use. Additionally, such a frame does not lend itself to use with the larger propane tanks envisioned by the instant invention, but is more specifically directed toward small fertilizer tanks behind a farm tractor. Furthermore, this tank carrier does not provide the four wheeled stability of the instant invention; stationary use depends on two caster wheels and a third leg stand for support.

U.S. Pat. No. 5,145,311, issued to Salvucci, speaks to a four wheeled hand truck having a jack for raising cylindrical tanks for movement on and off of a dolly or cart. Salvucci's invention contemplates cylindrical tanks which stand in an upright fashion and relies on a complex system of pulleys and belts to raise and lower the tank. This invention is not intended to be towed behind a vehicle, or to provide long term stability if the tank is left in place. It merely acts as a transfer mechanism for moving vertical tanks from a receiving dock onto and off of a man-portable dolly.

The present invention overcomes the problems presented by the above mentioned references. In addition, the instant invention provides the benefits of simplified construction, adaptability to various shapes of tanks (e.g., non-cylindrical), and man-portability or towing behind a vehicle.

SUMMARY OF THE INVENTION

A carrier for transporting tanks or pressure vessels is provided by removably attaching front and rear support carriages to the vessel. Each support carriage provides an independent mechanism for raising and lowering the respective ends of the vessel after attachment. The front and rear carriages and the vessel itself cooperate to form an integral transport structure.

It is an object of the present invention to provide a transport carrier for a vessel which is readily adaptable to tanks of varying lengths.

It is another object of the present invention to provide a transport carrier for a vessel which is man-portable or can be towed behind a vehicle.

It is yet another object of the present invention to provide a transport carrier for a vessel which consists of a first and second support carriage, each carriage independently attached to one end of the vessel.

A still further object of the present invention is to provide a transport carrier for a vessel which allows independent elevation of either end of the vessel.

It is also an object of the present invention to provide a transport carrier for a vessel which has at least four wheels for increased stability, both when the tank is in motion or left in place.

It is a further object of the present invention to provide a transport carrier for a vessel which can be readily attached to the vessel even when obstructions exist on up to three sides of the vessel.

It is also an object of the present invention to provide a transport carrier for a vessel whose component parts are substantially smaller than the length of the vessel so that the carrier can be easily stored.

It is yet another object of the present invention to provide a transport carrier for a vessel having independent pivot axle means on each carriage for increased maneuverability.

A still further object of the present invention is to provide a transport carrier for a vessel which uses the vessel itself as part of the structure for the carrier, thus obviating large structural components.

In satisfaction of these and relative objectives, a transport carrier for a vessel is disclosed comprising a first support carriage, and a second support carriage, between which the vessel to be carried is disposed. Each carriage is removably attached to one end of the vessel, and each carriage supports the vessel by means of a support yoke. Each carriage also possesses a means to raise or lower the respective end of the vessel to which it is attached.

To provide for movement of the vessel, each carriage is supported by a pair of wheels, and either one or both carriages may be pivotally attached to the support yokes. The carriages may also be fitted with cushions to protect the vessel from physical damage and at least one of the carriages should have a tow-handle attached for man-powered transport or attachment to a trailer hitch on a vehicle.

Once the carriages are attached to each end of the vessel, the vessel itself becomes a part of the structure of the carrier, and may either be left in place or moved, as desired. Adjustments may be made to each carriage to raise or lower the tank and provide any necessary leveling or tilting functions as needed.

The novel features that are considered characteristic of this invention are set forth with particularity in the appended claims. The invention will best be understood from the following description when read in connection with the accompanying drawings.

DETAILED DESCRIPTION OF THE PREFERRED EMBODIMENT

The transport carrier of this invention is shown in FIGS. 1-5 and referenced generally therein by he numerals (20) and (30), which refer to the rear support carriage and front support carriage, respectively.

Figure 1:
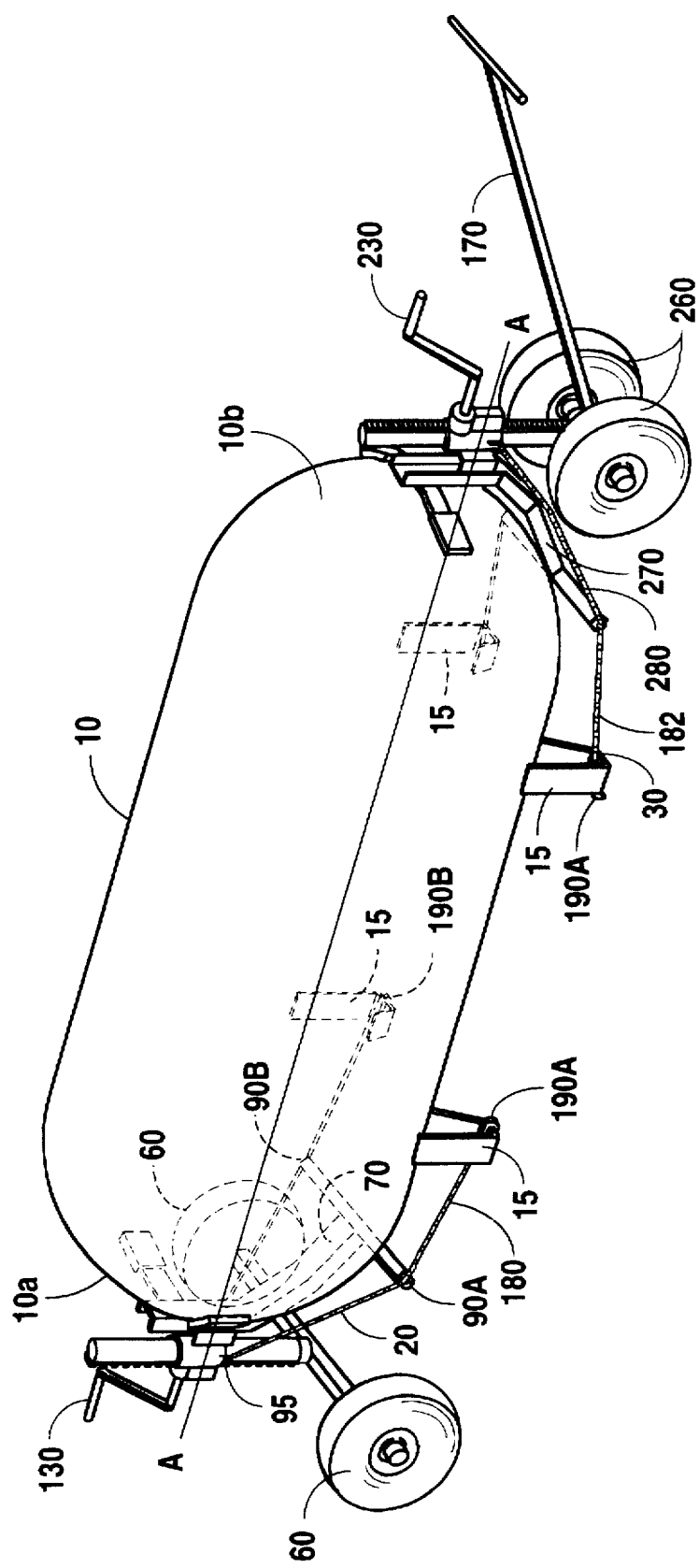
FIG. 1 is a perspective view of the preferred embodiment attached to a typical vessel.

Referring now to FIG. 1, it can be seen that the vessel (10) actually becomes an integral part of the structure of the transport carrier when the rear support carriage (20) and the front support carriage (30) are attached to the vessel (10). In FIG. 1 these attachments occur at the vessel legs (15). However, any vessel having appropriate attachment legs or loops may be transported by this system.

In the preferred embodiment, attachment to the vessel (10) occurs by way of chain (180) and chain hooks (190A and 190B). In use, at least one chain (180) with chain hooks (190A and 190B) is required for use with each support carriage (front support carriage (20) and rear support carriage (30)). One chain hook (190A) is hooked onto one vessel leg (15). Chain (180) is then attached to frame hook (90A) and attached to gear drive hooks (95). The remainder of chain (180) is then attached by its links to frame hook (90B). Chain hook (190B), on the terminal end of chain (180), is attached to the other vessel leg (15) on that end of the vessel (10).

The slack in chain (180) is taken out by this method of attachment to rear support carriage (20), discussed in more detail below, and by way of crank (130) which serves to elevate the end of vessel (10) attached to rear support carriage (20). Similarly, a single front chain (182) with attached hooks (190A and 190B) is attached to vessel legs (15) on the other end of vessel (10) and also to front support carriage (30). Crank (230) is used to elevate the front end of the vessel (10), and to take some of the slack out of the front chain (182). It should be noted that any of several methods, other than that illustrated in this preferred embodiment, could be used to attach rear support carriage (20) and front support carriage (30) to vessel (10) for transportation. As an example, a cable (to take the place of chain (180)) and heavy-duty magnets (to take the place of hooks (190A and 190B)) could be used for tanks made of ferrous materials that have no vessel legs (15) for purposes of attachment.

Once vessel (10) with a longitudinal axis (A) has been attached to rear support carriage (20) and front support carriage (30), the entire structure cooperates to provide a means for transport of vessel (10). Wheels (60 and 260) allow the assembled transport carrier to move and handle (170) provides a means for manual transport, or, as an alternative, handle (170) can be adapted to use with a trailer hitch for towing the assembled transport carrier behind a vehicle.

Figure 2:
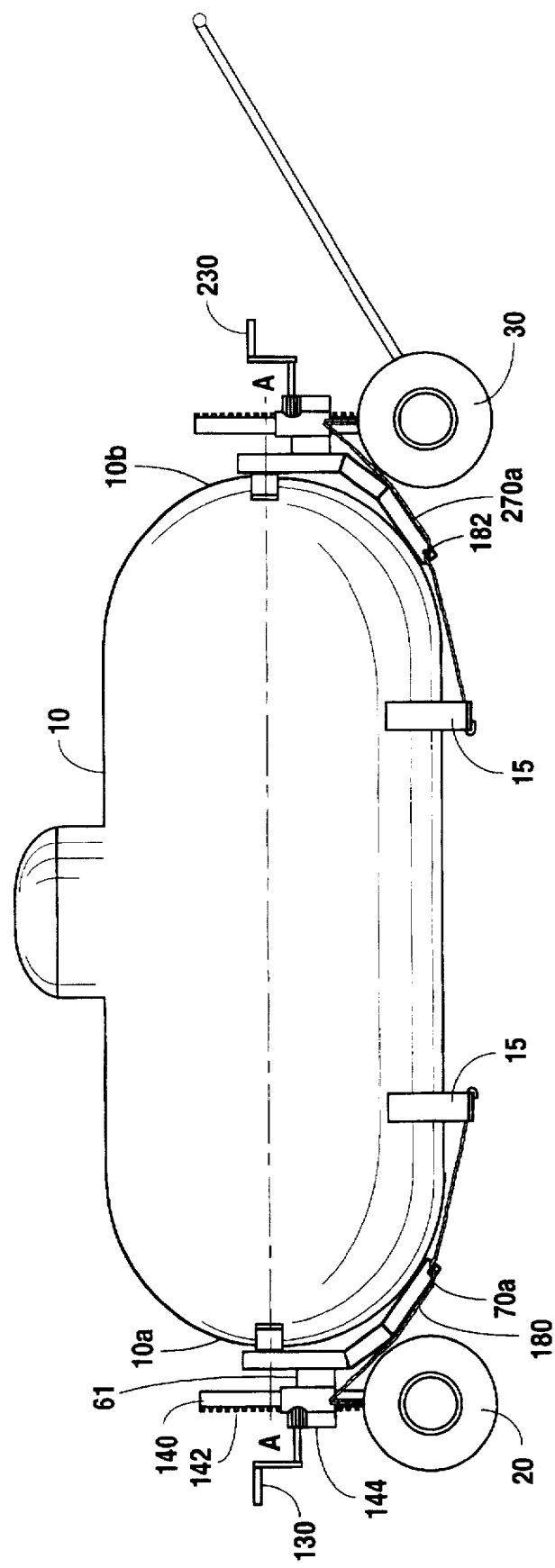
FIG. 2 is a side view of the preferred embodiment attached to a typical vessel.

Turning now to FIG. 2, it can be more clearly seen how vessel (10) is attached by means of chains (180 and 182) to vessel legs (15) to form an integral structure. The fact that the assembled carrier is not perfectly rigid assists in the negotiation of various rough road conditions over which the vessel (10) may be transported. That is, since rear support carriage (20) and front support carriage (30) are not rigidly attached to vessel (10), the integral structure formed by the attachment of vessel (10) to the front and rear support carriages (20 and 30) can adapt to uneven road surfaces and shock conditions by way of the slight give and take present in the chains (180 and 182).

Figure 3:
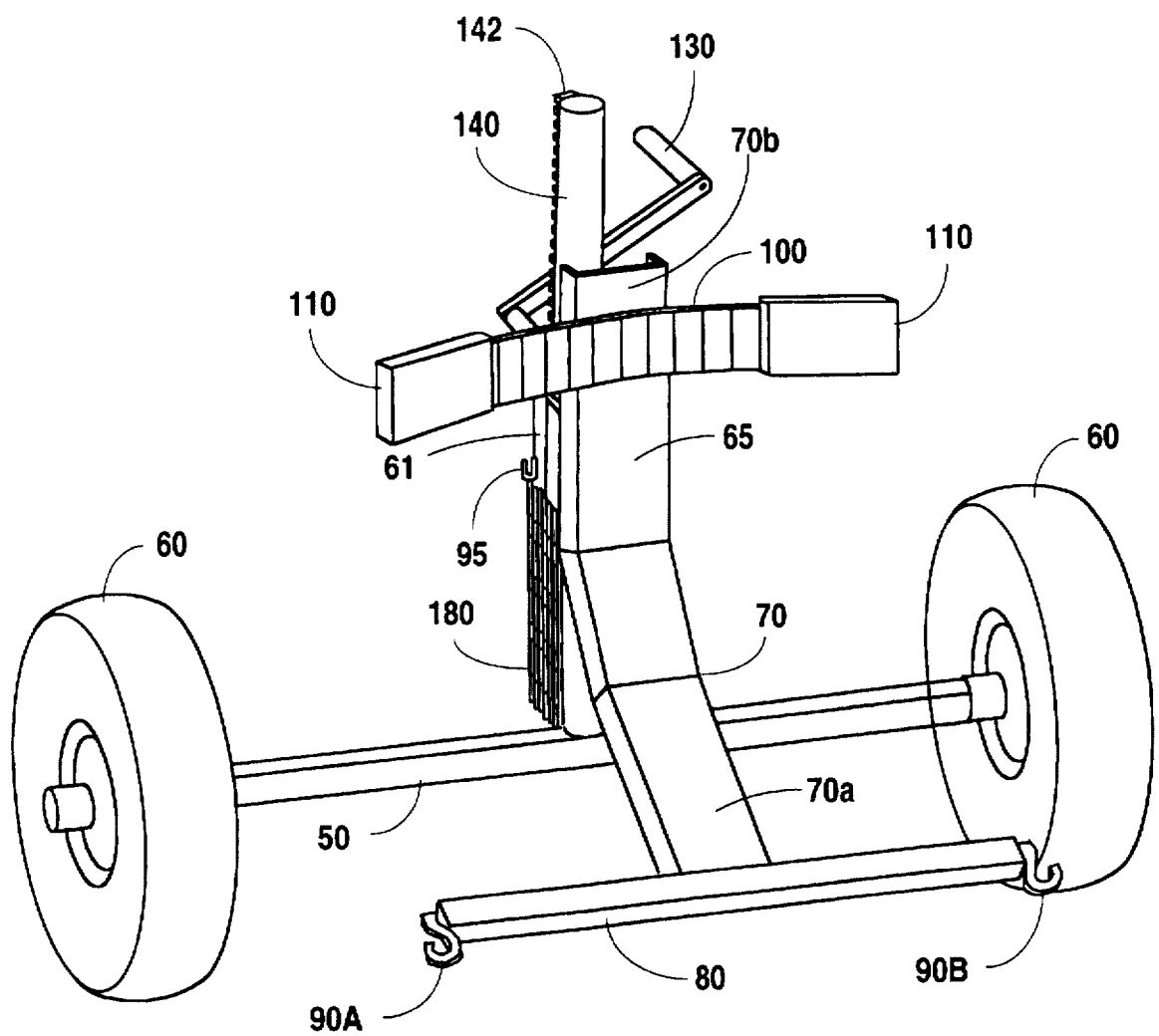
FIG. 3 is a perspective view of the rear support carriage.

Turning now to FIG. 3, a more detailed view of rear support carriage (20) can be seen. In the preferred embodiment, the support yoke (65) of rear arcuate support carriage (20) consists of the following elements: frame member (61), downwardly depending, arcuate lift arm (70), extensible beneath the first end (10a) of vessel (10); cross member (80) extending transversely across lower end portion (70a) of the lift arm (70) and extensible beneath the first end (10a) of the vessel (10); and an arcuate holding arm (100) extending transversely across the upper end portion (70b) of the arcuate lift arm (70). These elements (61, 70, 80 and 100) are rigidly attached to each other to form a support yoke (65) for one end (10a) of the vessel (10). A similar support yoke (265) is also used on front support carriage (30) as described below. (See FIG. 4.) The frame member (61) and, thus, support yoke (65) are raised and lowered along the length of rod (140) with gear rack (142) by means of pinion gear assembly (144) and crank (130). (See FIG. 2.) Cushions (110), shown here affixed to the distal ends of holding arm (100), may also be applied to other surfaces of the support yoke (65) to help protect vessel (10) from impact damage during transport. Rod (140) is, in the preferred embodiment, rigidly attached to axle (50) of rear support carriage (20). Wheels (60) are attached to the ends of axle (50) to allow the rear support carriage (20) to move with front support carriage (30), as cooperating members of the assembled transport carrier. Chain (180) is used in combination with frame hooks (90A and 90B) and gear drive hooks (95) to secure the vessel (10) to the rear support carriage (20). In the preferred embodiment, a single chain (180 or 182) can be used for each carriage. However, it is also possible to use multiple chains (210A and 210B) on a single carriage. For example, one chain on each side of front support carriage (30), can be used to secure vessel (10) by means of vessel legs (15). (See FIG. 5.)

Figure 4:
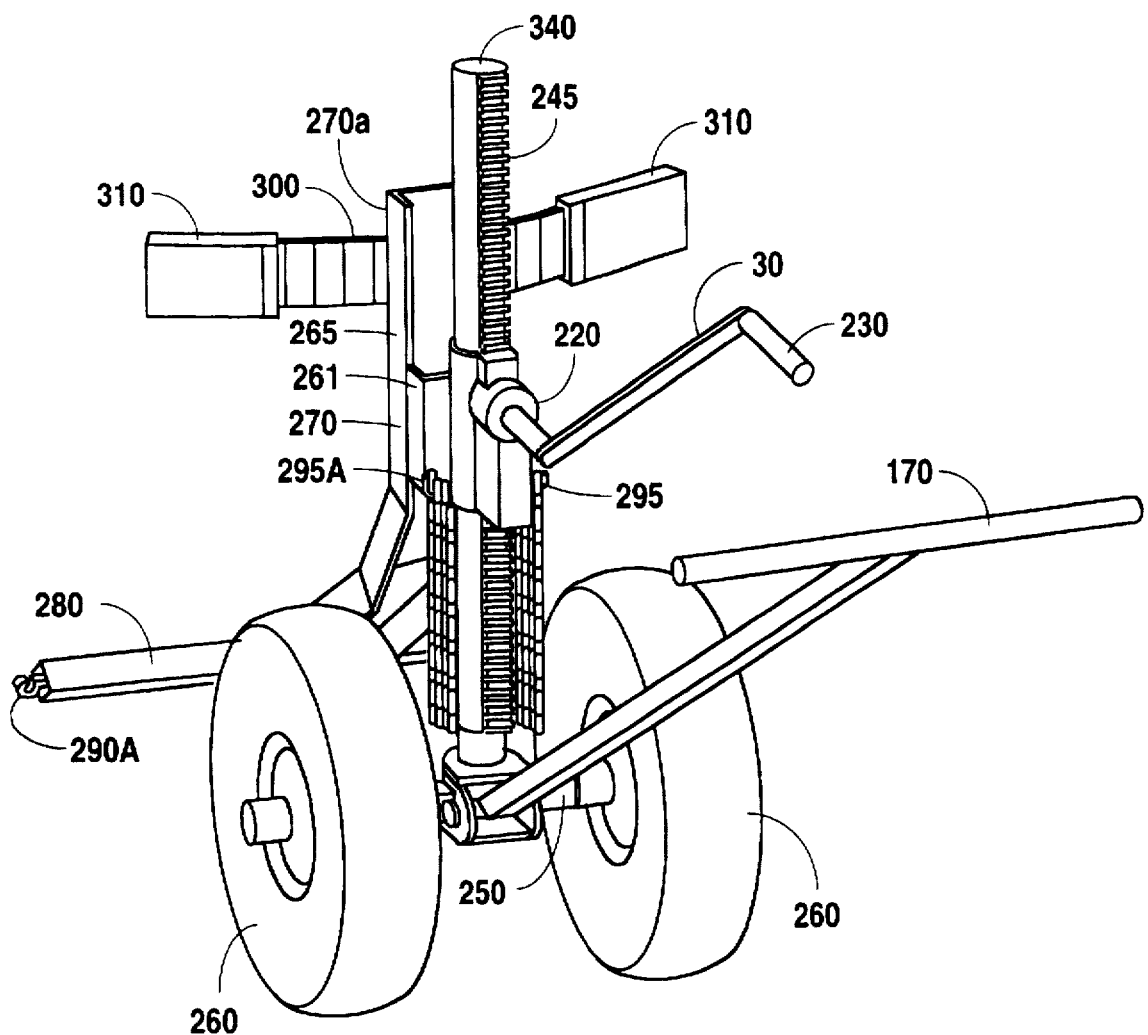
FIG. 4 is a perspective view of the front support carriage.

Turning now to FIG. 4, a more detailed view of the front support carriage (30) can be seen. Many of the elements used in rear support carriage (20) are common to front support carriage (30). These include: axle (250), wheels (260), support yoke (265), frame member (261), lift arm (270), cross-member (280), frame hooks (290A and 290B), gear drive hooks (295A and 295B), holding arm (300), cushions (310), crank (330), and rod (340). It may be noted in FIG. 4 that lift arm (270) is a downwardly depending, arcuate lift arm which is extensible beneath the second end (10b) of the vessel (10). Cross member (280) extends transversely across the lower end portion (270a) of the lift arm (270) and is extensible beneath the second end (10b) of vessel (10). Holding arm (200) is an arcuate arm extending transversely across the upper end portion (270b) of the arcuate lift arm (270).

Figure 5:
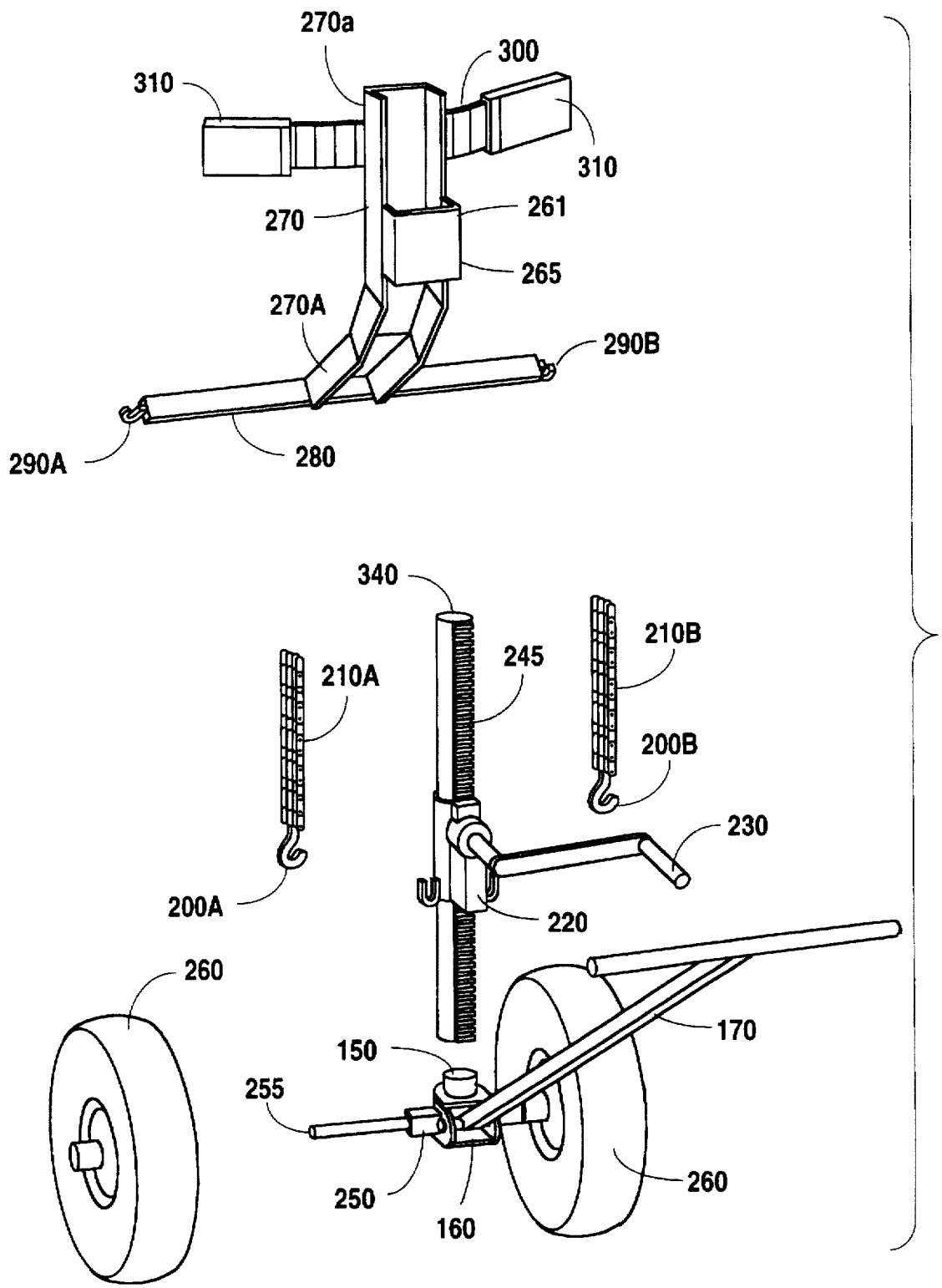
FIG. 5 is an exploded view of the front support carriage.

Turning now to FIG. 5, an exploded view of front support carriage (30) can be seen. In particular, the support yoke (265), consisting of elements yoke member (261), lift arm (270), cross-member (280), and holding arm (200), can clearly be seen to exist as an integral structure. In the preferred embodiment, this support yoke (265) structure is rigidly affixed to a mechanism for raising and lowering the structure along the length of frame member (340). In this instance, the mechanism is illustrated as a gear drive (220) cooperating with gear rack (245). Crank (230) is used to place gear drive (220) in motion so as to raise and lower the support yoke (265) structure manually. As an alternative, a hydraulic lift mechanism can be used in place of crank (230) and gear drive (220) cooperating with gear rack (245) to raise and lower the support yoke (265) structure. Electric motors, friction drives, and other means are also useable for raising and lowering the support yokes (65 and 265).

In the preferred embodiment, axle (250) of front support carriage (30) can be seen to contain rolling bar (255) which is connected directly to wheels (260). Thus, wheels (260) are allowed to freely rotate within axle (250). Several alternative attachment methods for wheels (260) are available; for example, axle (250) may consist of a solid bar with bearings and attachment means at each end for attachment to wheels (260). In a more sophisticated version, a differential drive mechanism, such as is used on conventional automobiles, could also be effected. Finally, shock absorbers or springs, or other means to accommodate rough terrain, can be applied to the juncture where wheels (260) are attached to axle (250). It should be understood that similar axle and spring arrangements may be used with rear support carriage (20).

In the preferred embodiment, frame pivot (150) is used to allow the combination of wheels (260) and axle (250) to rotate about the vertical axis of rod (340) of front support carriage (30). While not illustrated in the figures, rear support carriage (20) can also be constructed so that rod (140) is connected in a pivotal fashion to axle (50). This would provide for dual-pivot mobility when rear support carriage (20) and front support carriage (30) cooperate to transport vessel (10), resulting in increased maneuverability.

A single chain (180) (used in the preferred embodiment) or dual chains (210A and 210B), as illustrated in FIG. 5, can be used to attach vessel (10) to front support carriage (30). Similar attachment methods can be used to secure vessel (10) to rear support carriage (20). When dual chains (210A and 210B) on each carriage are used, a first chain (210A) is hooked through one of the links onto one of the gear drive hooks (295A) (attached to gear drive (220)), extended through and attached to one of the frame hooks (290A) on cross-member (280), and further directed so as to attach to one of the vessel legs (15) by means of a first chain hook (200A). Similarly, a second chain (210B) is hooked through one of its links onto another gear drive hook (295B) (not illustrated in FIG. 5 but seen in FIG. 4), directed toward the other frame hook (290B) of front support carriage (30) and attached to it, and further directed to another of vessel legs (15) and hooked on to it by means of a second chain hook (200B). If a single chain (180) is used for each carriage, as is shown in the preferred embodiment, then links near the mid-point of that single chain (180) would be attached to both gear drive hooks (295A and 295B) on the front support carriage (30) to which it is attached. It should be understood that a two-chain or one-chain system may also be used on the rear support carriage (20). FIG. 1 illustrates that as the front and rear supports are attached, the arcuate lift arms 70 and 270 are aligned with the longitudinal axis (A) of the vessel (10) with the cross members extending transversely beneath the first (10a) and second (10b) ends of the vessel.

Once the attachments discussed above have been made to the vessel (10), cranks (130 and 230) may be operated so as to raise the support yoke assemblies, thereby acting to raise the ends of vessel (10). After attachment, each end of vessel (10), one supported by rear support carriage (20) and one supported by front support carriage (30), can be raised or lowered independently to level the vessel (10) for transport, or tilt the vessel (10) in a stationary position, as needed. The vessel (10) is pulled into position between the carriages as the slack is removed from chains (180 and 182). (See FIGS. 2 and 5.) In the case of the front support carriage (30), the slack is first removed from the links of chain (182) disposed between the carriage gear drive hooks (295A and 295B) and their corresponding frame hooks (290A and 290B) as the support yoke (265) is elevated. This causes vessel (10) to contact and to be supported by the support yoke (265). As more tension is applied to chain (182) by further elevation of the support yoke (265), the slack is removed from the portion of chain (182) disposed between the frame hooks (290A and 290B) and vessel legs (15). The support yoke (265) is then further elevated until the front end of vessel (10) is positioned at the desired height for transport via wheels (260). A similar process is required to prepare the rear support carriage (20) for transport of vessel (10).

Handle (170) illustrated in FIG. 5 is attached to axle (250) by means of handle pivot (160). This allows handle (170) to move up and down for man-portable operation. In addition, handle (170) can be adapted to attach to a conventional trailer hitch for use by a towing vehicle. Other means of attaching handle (170) to axle (250) can be used. For example, handle (170) can be attached to axle (250) by way of a tow rope or other flexible device. Also, handle (170) can be manufactured so as to allow for both man-portable operation and use with a towing vehicle with proper mechanical attachments.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications as fall within the scope of the invention.

I claim:

1. A transport carrier for a vessel having a first longitudinal axis, a first end and a second end comprising:

a first support carriage having a first frame member;

a first axle pivotally attached to said first frame member, and first and second rotatable wheels affixed to said first axle;

a first arcuate support yoke, said first arcuate yoke further comprising:
 a first downwardly depending arcuate lift arm extensible beneath said first end of said vessel;
 a first arcuate holding arm extending transversely across an upper end portion of said first lift arm;
 a first cross member extending transversely across a lower end portion of said first lift arm, said first cross member extensible beneath said first end of said vessel;

a first means for elevating said first arcuate support yoke along the length of said first frame member, said first elevating means attached to said first support arcuate yoke and said first frame member; and a first means for removably attaching said first arcuate support yoke to said vessel;

a second support carriage having a second frame member;

a second axle attached to said second frame member, and third and fourth rotatable wheels affixed to said second axle;

a second arcuate support yoke, said second arcuate yoke further comprising:
 a second downwardly depending arcuate lift arm extensible beneath said second end of said vessel;
 a second arcuate holding arm extending transversely across an upper end portion of said second lift arm;
 a second cross member extending transversely across a lower end portion of said second lift arm, said second cross member extensible beneath said second end of said vessel;

a second means for elevating said second arcuate support yoke along the length of said second frame member, said second elevating means attached to said second arcuate support yoke and said second frame member;

a second means for removably attaching said second arcuate support yoke to said vessel; and said first and second support carriages cooperating to transport said vessel when said vessel is disposed between and removably attached to said first and second arcuate support yokes.

2. The transport carrier of claim 1, wherein said first support carriage has a tow-handle pivotally attached to said first axle.

3. The transport carrier of claim 1, wherein said first and said second elevating means each further comprise a geared jacking member.

4. The transport carrier of claim 1, wherein said first and said second elevating means each further comprise a hydraulic jacking member.

5. The transport carrier of claim 1, wherein said first and said second means for removably attaching said vessel to said first and said second support yokes further comprises a multiplicity of hooks and chains attached to said first and second support yokes.

6. The transport carrier of claim 1, wherein said first and said second support yokes further comprise cushion pads attached at distal ends of said yokes.

7. The transport carrier of claim 1, wherein said second axle is pivotally attached to said second frame member.

8. A method of transporting a vessel having a first longitudinal axis a first end and a second end comprising:

positioning a first support carriage at said first end of said vessel, said first support carriage further comprising:

a first frame member;

a first axle pivotally attached to said first frame member, and first and second rotatable wheels affixed to said first axle;

a first arcuate support yoke, said first arcuate yoke further comprising:
 a first downwardly depending arcuate lift arm extensible beneath said first end of said vessel;
 a first arcuate holding arm extending transversely across an upper end portion of said first lift arm;
 a first cross member extending transversely across a lower end portion of said first lift arm, said first cross member extensible beneath said first end of said vessel;

a first means for elevating said first arcuate support yoke along the length of said first frame member, said first elevating means attached to said first arcuate support yoke and said first frame member;

a first means for removably attaching said first arcuate support yoke to said vessel;

positioning a second support carriage at said second end of said vessel, said second support carriage further comprising:

a second frame member;

a second axle attached to said second frame member, and third and fourth rotatable wheels affixed to said second axle;

a second arcuate support yoke said second arcuate yoke comprising:
 a second downwardly depending arcuate lift arm extensible beneath said second end of said vessel;
 a second arcuate holding arm extending transversely across an upper end portion of said second lift arm;
 a second cross member extending transversely across a lower end portion of said second lift arm, said second cross member extensible beneath said second end of said vessel;
 a second means for elevating said second arcuate support yoke along the length of said second frame member, said second elevating means attached to said second arcuate support yoke and said second frame member;
 a second means for removably attaching said second arcuate support yoke to said vessel;

attaching said first arcuate support yoke to said first end of said vessel, said first arcuate lift arm aligned with said first longitudinal axis of said vessel, said lower end portion of said first lift arm positioned beneath said first end of said vessel;

attaching said second support yoke to said second end of said vessel, said second arcuate lift arm aligned with said first longitudinal axis of said vessel, said lower end portion of said second lift arm positioned beneath said second end of said vessel;

elevating said first end of said vessel and said second end of said vessel; and towing the combination of said vessel, said first support carriage, and said second support carriage.

\* \* \* \* \*